United States Patent [19]

Schüssler et al.

[11] 4,081,792

[45] Mar. 28, 1978

[54] MONOLITHICALLY INTEGRATED SEMICONDUCTOR CIRCUIT ARRANGEMENT

[75] Inventors: Hans Schüssler, Ulm (Danube); Hans-Jürgen Wulf, Heilbronn; Bernhard Rall, Ulm (Danube); Helmut Knapp, Pfuhl, all of Germany

[73] Assignee: Licentia Patent-Verwaltungs-G.m.b.H., Frankfurt am Main, Germany

[21] Appl. No.: 670,825

[22] Filed: Mar. 26, 1976

[30] Foreign Application Priority Data

Mar. 29, 1975 Germany .............................. 2514012

[51] Int. Cl.² .............................................. H04Q 3/00
[52] U.S. Cl. ............................ 340/166 R; 179/18 GF
[58] Field of Search .............. 340/166 R; 179/18 GF; 307/239, 241

[56] References Cited

U.S. PATENT DOCUMENTS

| 3,550,088 | 12/1970 | Jones | 179/18 GF |
| 3,760,361 | 9/1973 | Leger | 179/18 GF |
| 3,875,563 | 4/1975 | Hosokawa | 340/166 R |
| 3,976,974 | 8/1976 | Hinohara | 340/166 R |

*Primary Examiner*—Harold T. Pitts
*Attorney, Agent, or Firm*—Spencer & Kaye

[57] ABSTRACT

A monolithically integrated semiconductor matrix circuit arrangement comprising switching elements which are connected in pairs at one terminal. This common terminal of the pair of switching elements is connected to an input (or output) circuit path and other terminal of each switching element is connected individually to an output (or input) circuit path respectively.

10 Claims, 9 Drawing Figures

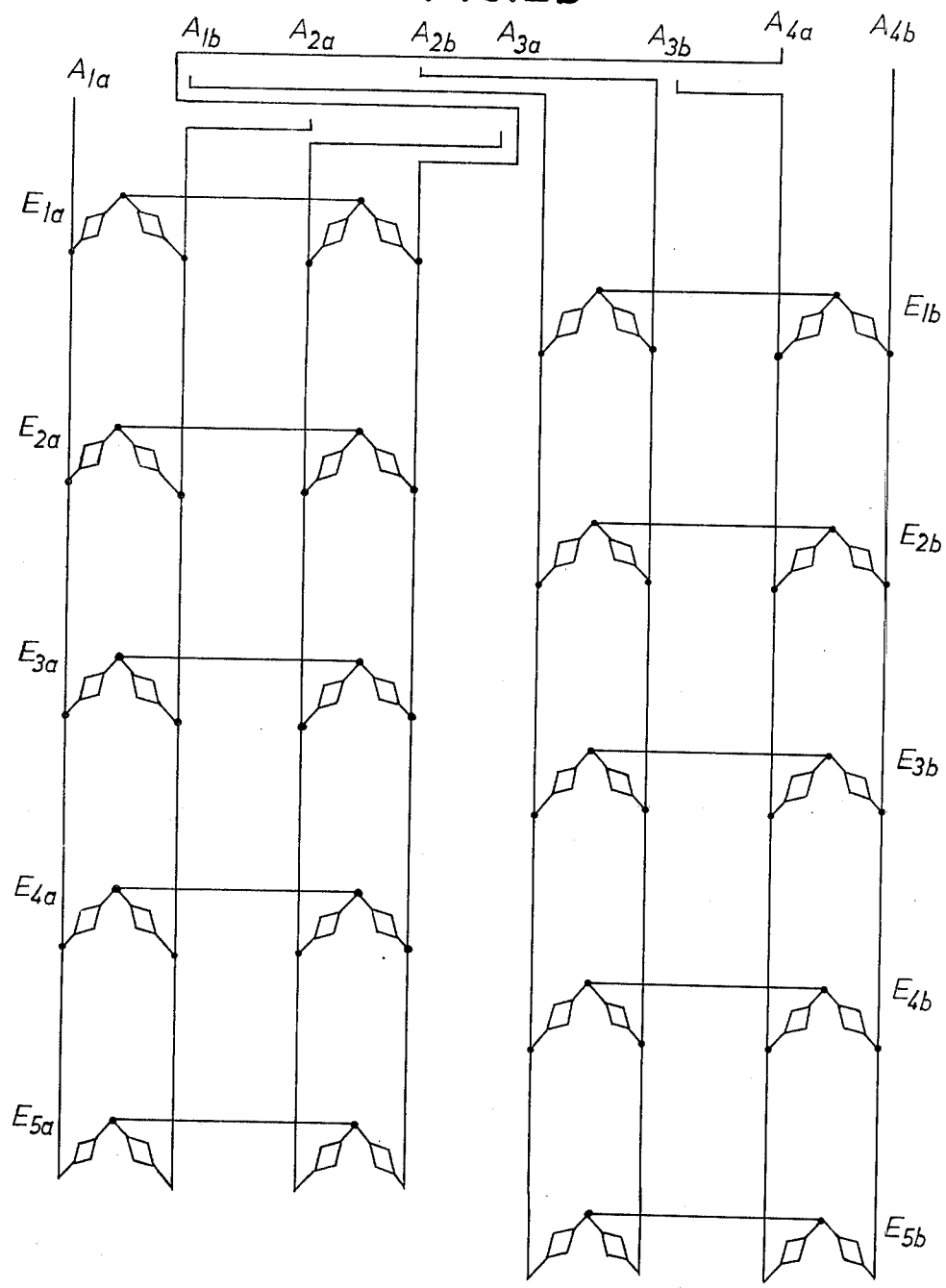

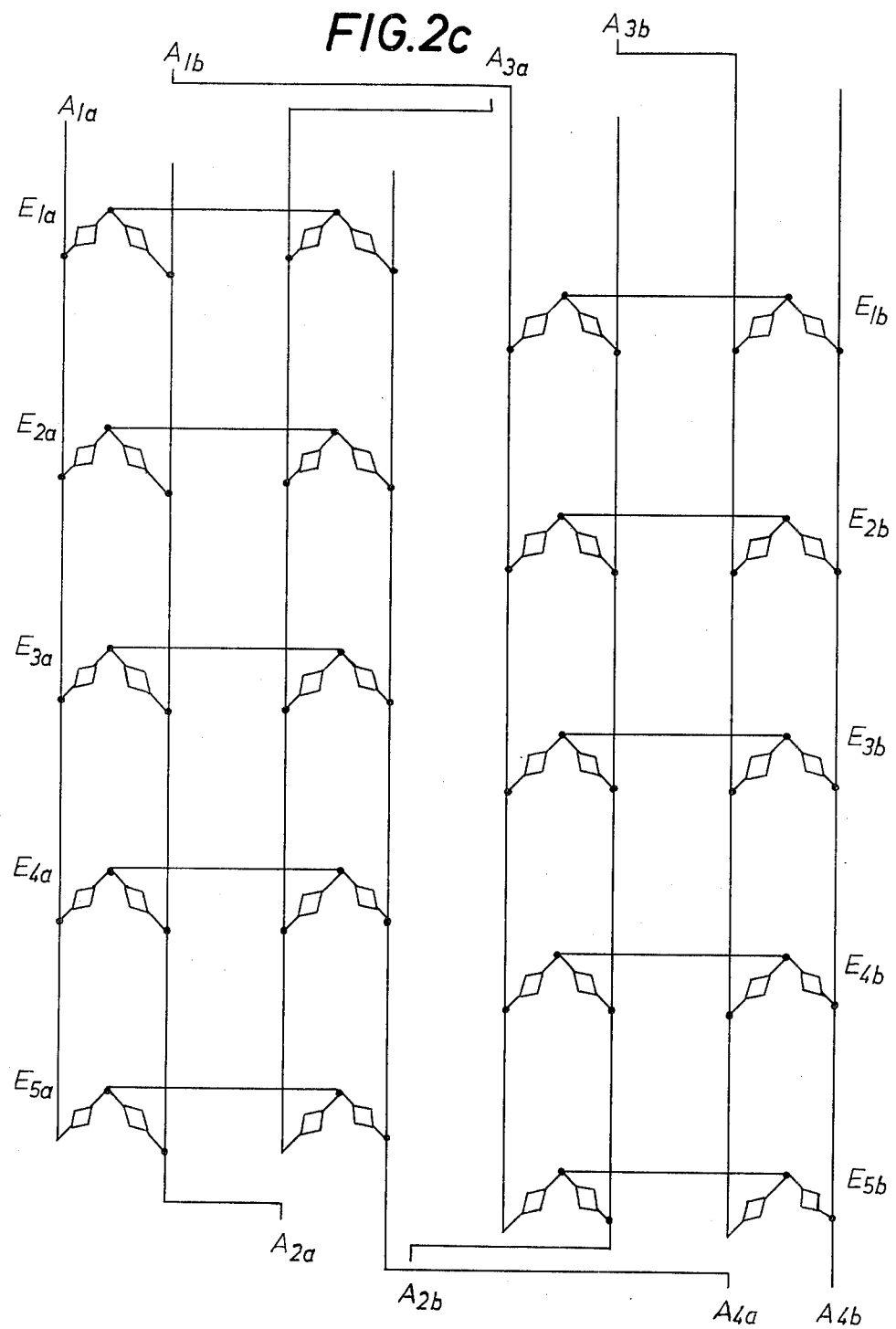

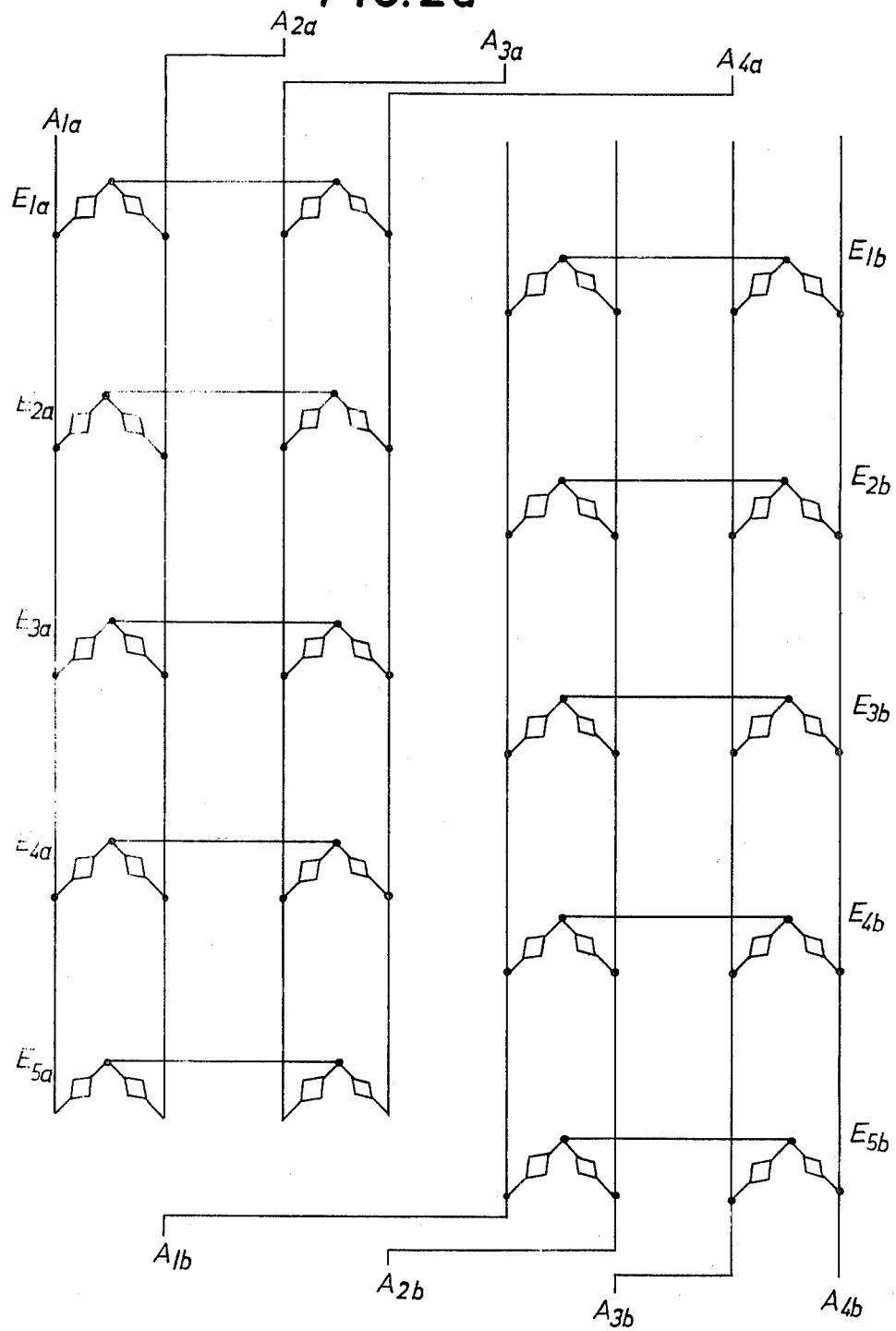

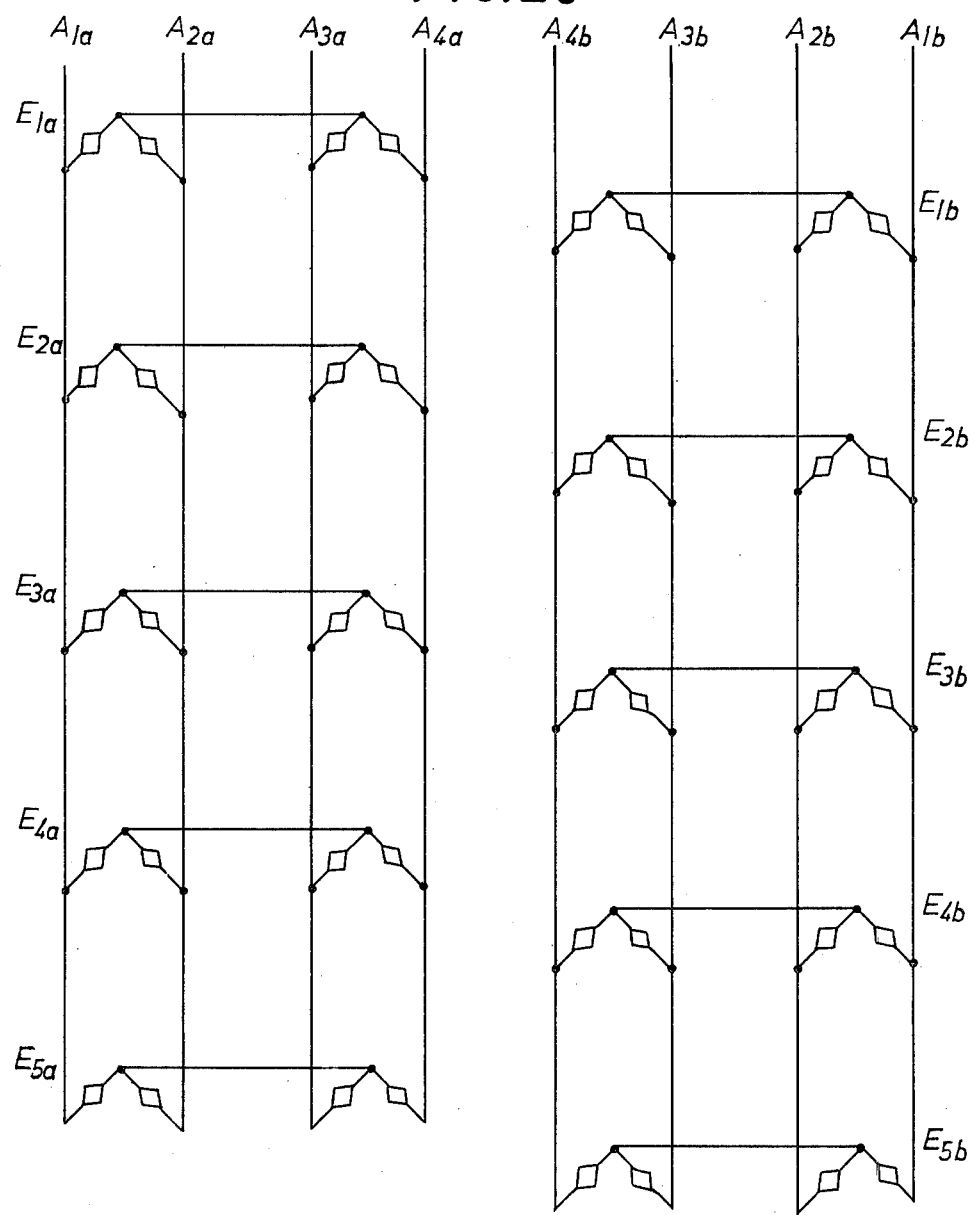

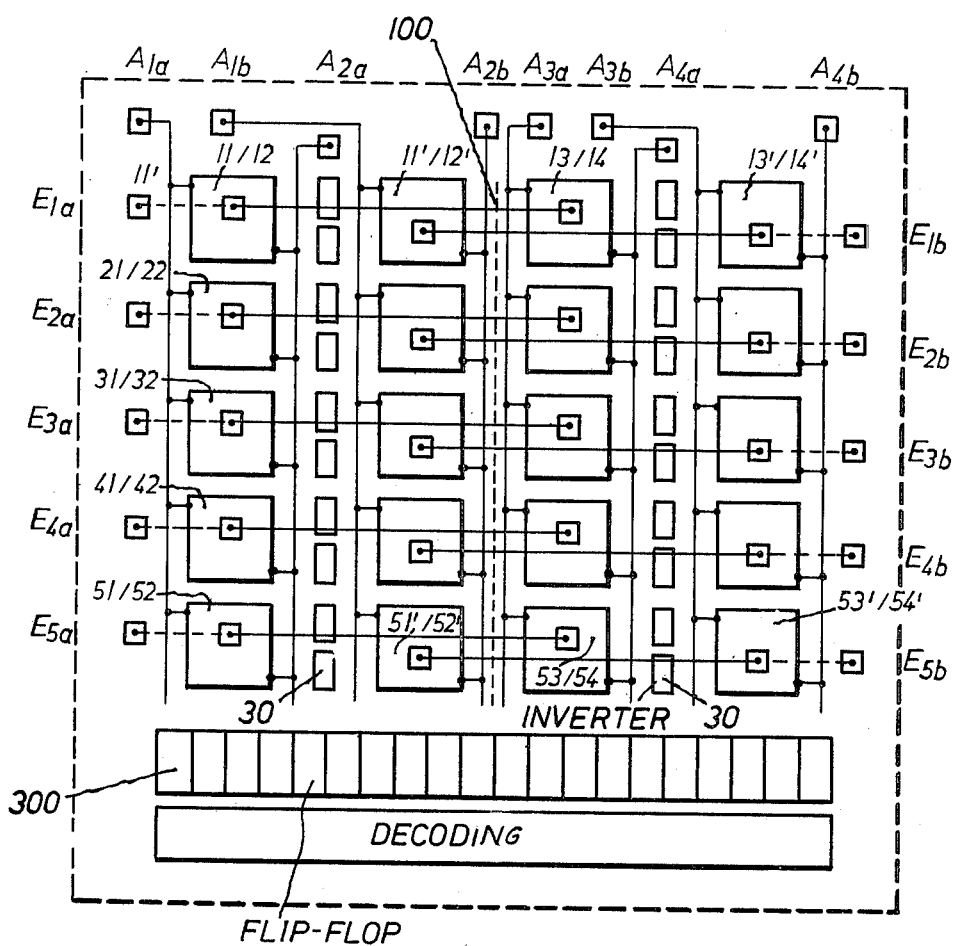

4,081,792

MONOLITHICALLY INTEGRATED SEMICONDUCTOR CIRCUIT ARRANGEMENT

BACKGROUND OF THE INVENTION

The invention relates to monolithically integrated semiconductor circuit arrangement, particularly for crosspoint arrays of switching systems, with semiconductor switching elements in matrix form arrangement, with intersecting input and output circuit paths, which may be connected together by means of switching elements, with control or triggering means for operating the switching elements and control or triggering lines from the control means to the switching elements.

Switching networks are common in communication technology for connecting a number of input and output lines. Conventional switching or connecting networks are predominantly constructed with mechanically or electromechanically operated switch contacts. Recently, switching networks were also known in which semiconductor elements are provided as switches.

Thus, for example, in German Auslegeschrift No. 1 298 188, an arrangement is described which is referred to as a switching network with electronic switching for telecommunications exchanges. The switching network comprises one or several connecting stages connected together via a link; the individual connecting stages in turn consist of several connecting matrices, and in which the switching of a transmission will be started by applying marking potentials to the columns and rows of the switching matrix. Such arrangements predominantly use four-layer elements as switches which have the property of being very low in impedance when connected, and when blocked have a low coupling capacity. In the cited application, reference is made to the fact that it is difficult to maintain the high decoupling values which are necessary for applications in telecommunications technology, with monolithic integration of several cross-points of a connecting matrix. In the above application, a rule is given as to how better properties of the elements may be achieved by additional changes in the semiconductor body, e.g. by changing the life span of the minority charge carrier.

A further development of such connecting matrices, particularly with respect to an improvement in the control or triggering possibilities, is described in German Auslegeschrift No. 1 812 542. By combining, in monolithic integration, the four-layer element forming a switch with a MOS element for control or triggering it is possible to achieve a high impedance characteristic for the control or triggering of the element. A particular speciality of these proposals may be seen in the control concept for such connecting matrices. The transmission path across the switching network may be built up automatically in the proposed arrangement and may be constructed with freedom of choice via several stages, if the two ends of the desired transmission path are marked. The cross-point elements ignite in an arbitrary manner and only the transmission path which is built up between the two marked ends may be maintained.

Another possibility for switching of telephone signals is described in DAS 2 033 647, which is based on the fact that MOS transistors are used as switches. In this application special control or triggering and logic processing circuits are for example proposed for control of switching matrices. Thus, the idea of combining the switching transistors to the control or triggering logic of the coupling matrix in the form of an integrated MOS circuit has already been mentioned.

Furthermore, from German Auslegeschrift No. 2 333 190 it known to design switching elements constructed as semiconductor switches for balanced transmission. Thus, the control electrodes of the two connection elements necessary for the construction of a connection should be connected and the control current should be supplied to this common line. In all previously known arrangements the disadvantage may be recognized that the requirement for a very high switching ratio, i.e. a very low resistance to connection and a very low residual coupling when disconnected, may only be achieved at additional expense.

Thus, of course, the degree of integration which may be achieved for switching elements with the desired properties, i.e. a forward resistance lower than approximately 10 ohms and "off"-attenuation greater than 100 dB, is very low. However, only very highly integrated switching matrices with a large number of crosspoints come into consideration for an economical solution in communication technology, because only in this manner may the lowest costs per crosspoint be produced.

SUMMARY OF THE INVENTION

An object of the invention is to provide a circuit arrangement with a plurality of switching elements used as a crosspoint which have a low forward resistance when closed and a high reverse resistance when open and in which, despite a relatively large number of switching elements being arranged in a small space, a good security against cross-talk may be achieved and which may be manufactured with the known methods of semiconductor technology in a simple and economic manner.

According to a first aspect of the invention, there is provided a monolithically integrated semiconductor circuit arrangement comprising input circuit paths, output circuit paths intersecting with said input circuit paths, and switching elements connected in pairs at one terminal thereof with said one terminals of the pair connected to circuit paths belonging to one of said input or output circuit paths and with others of their terminals connected individually to individual ones of said output or input circuit paths respectively.

According to a second aspect of the invention, there is provided a monolithically integrated semiconductor circuit arrangement, particularly for crosspoint arrays of communications switching systems with semiconductor switching elements in a matrix form arrangement with intersecting input and output circuit paths which may be connected together by means of the switching elements, with control or triggering means for operating the switching elements and control or triggering lines leading from the control or triggering means to the switching elements, characterized in that the switching elements respectively connected in pairs are arranged between every second input or output circuit path such that the switching elements which have been connected together in pairs are connected together to the adjacent input line with one of their terminals and are connected individually to one of the adjacent output lines with their other terminal respectively.

BRIEF DESCRIPTION OF THE DRAWINGS

The invention will now be described in greater detail, by way of example, with reference to the drawings, in which:-

FIGS. 2a, to 2e, show embodiments of circuit arrangements according to the invention in a schematic view;

FIG. 3 shows a layout block diagram of a switching matrix with 5 × 4 cross points;

DESCRIPTION OF THE PREFERRED EMBODIMENT

In a preferred embodiment of the invention, in a semiconductor circuit arrangement of the type described in greater detail at the beginning, the switching elements are connected together in pairs between every two input or output circuit paths, the switching elements joined together in pairs respectively are arranged with one of their terminals connected together to the next input line and with their other terminals connected individually to every one of the adjacent output lines.

By means of this measure extensive "planarization" can be achieved, particularly of the area of the circuit arrangement farther inside, i.e. the number of points of intersection between circuit paths is considerably decreased, the paths forming a spatial structure in constrast to the circuit arrangement which otherwise extends in a predominantly laminar manner. Similarly, the number of contact points in the two-layer wirings necessary for the construction of elements of a high degree of integration is greatly reduced.

The invention offers the advantage of being able to join together a relatively large number of crosspoints in a very small space. In this manner, a crosspoint array is formed with small dimensions in comparison to conventional switching matrices, which leads to significant savings in space in Tele-communications equipment. Despite the closely packed arrangement of crosspoints in the very small space, unwanted capacitive coupling between lines which are not switched together, which could have the result of undesirable cross-talk, is substantially avoided by reducing the number of circuit path intersections. Finally, it has become evident that as the result of a reduced number of circuit path intersections and contacts the manufacturing yield of the crosspoint array may be considerably increased. Just at the over crossing there is in fact, in methods of manufacturing integrated circuits common today, a certain probability of the occurrence of short circuits which result in the entire circuit being unusable. On the other hand, with the contacts there is the problem of representing a sufficiently small contact resistance with the limited size of the contact points.

In an advantageous manner, crosstalk attenuation is increased by a screening effect which results from the fact that the control or triggering means provided in the circuit arrangement for switching the crosspoints "on" or "off", as well as the control or triggering lines leading from the control means to the switching elements, are arranged in a column between every other column of the switching elements.

Figure 1:
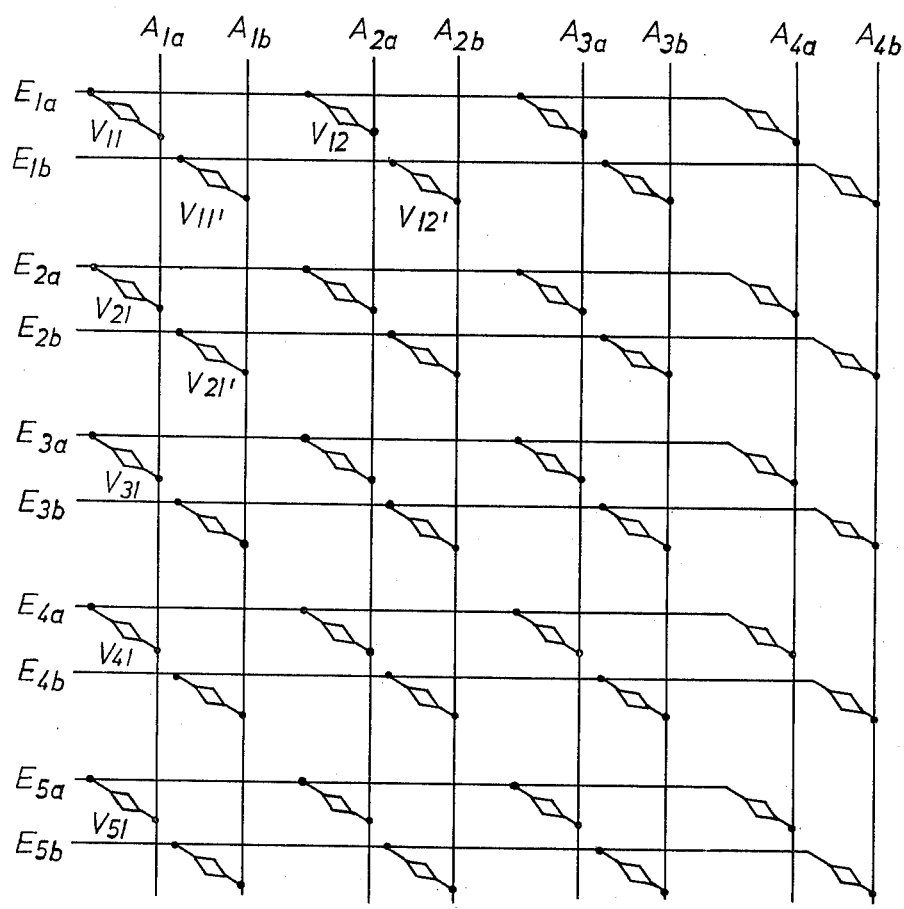
FIG. 1 shows a switching matrix known per se with input and output circuit paths and matrix-positioned switching elements.

Referring to the drawings, FIG. 1 shows first of all, a balanced connecting matrix known per se similar to a type of a crossbar system which contains input line pairs E1a, E1b, ... E5a, E5b, output line pairs A1a, A1b, ... A4a, A4b and switching elements V11,V11', ... V54,V54' which are only indicated schematically. In order to make a connection between the input lines E1a,E1b and the output lines A1a,A1b, for example, the switching elements V11 and V11' must be switched on, while all remaining switching elements remain blocked. This crosspoint array consists of a matrix of 5 × 4 balanced crosspoint, wherein each coupling point contains two switching elements. The desired coupling balance through 4 equal intersection capacities which do not lead to any undesirable coupling with earth symmetrical transmission, is to be eliminated for technological reasons. The relatively large number of circuit path intersections is disadvantageous in such an array since the intersections result in undesirable unequal capacitative couplings between the intersecing lines and the danger of short circuits is increased as a result of the process of manufacture. As a result, it is considerably more difficult to maintain the high attenuation values generally required in order to avoid cross-talk and to achieve appropriate manufacturing yield of these semiconductor devices.

With the invention a considerable reduction in the number of circuit path intersections and contacts may be achieved and both a reduction in the danger of unsystematic capacitative cross-coupling and cross talk, as a result of the fact that the switching elements are brought together in pairs between every other input or output circuit path so that the switching elements brought together in pairs respectively are arranged with one of their terminals connected together to the next input line and with their other terminals connected individually to one of the adjacent output lines.

This is described in greater detail below with respect to FIG. 2.

Figure 2A:
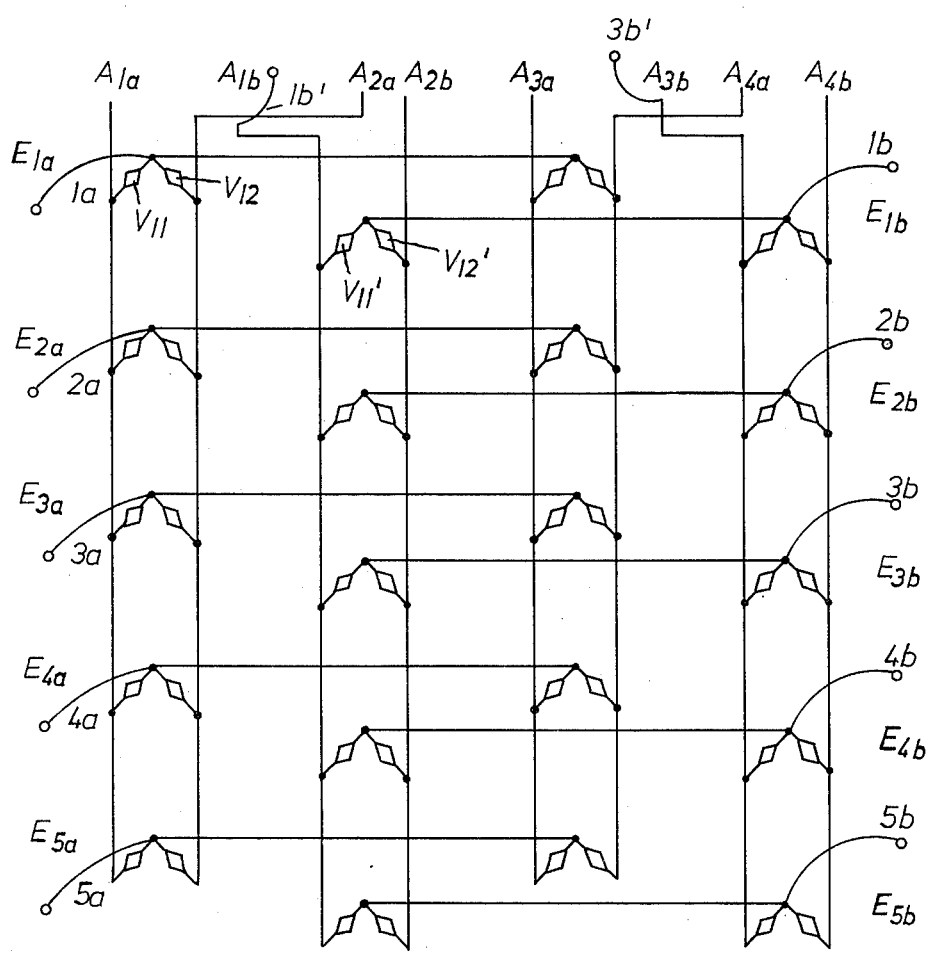

In FIG. 2a there is shown a matrix-form arrangement of schematically indicated switching elements V11,V11' ... V54,V54' with input lines E1a,E1b. ... E5a,E5b and output lines A1a,A1b,. .. A4a,A4b. This arrangement represents a switching matrix of 5 × 4 cross-points, wherein each crosspoint has two switching elements. The switching elements are joined together in pairs respectively. The switching elements V11 and V12 are regarded as an example and are arranged between two output lines A1a,A2a and two input circuit paths E1a,-E2b. With one of their connections, each of the switching elements are connected together, the connecting point is connected to the adjacent input line E1a. Each of the switching elements V11,V12 is passed to one of the adjacent output lines A1a,A2a separately with its other connection. In the schematic view, chosen here, of the switching elements only those terminals of the switching elements are shown which take part directly in making a connection between circuit paths of the input and output lines. As further stated below, the switching elements are semiconductor elements such as, MOS transistors which have at least one further terminal via which a control or triggering signal is supplied, which signal causes switching "on" or "off" of the switching element. These terminals are not shown in the Figure. They may be left out of consideration in the discussion of the transmission properties, because, in the refinement, in accordance with the invention, of the control or triggering circuit, the control terminals of the switching elements are connected to the earth line always with low resistance for capacitive coupled alternating currents. As may be seen from FIG. 2a, such an arrangement of the switching elements and the arrangement, of the input and output circuit paths leading to these switching elements leads particularly in the inner region of the circuit arrangement to a substantially reduced number of circuit path intersections, which generally give rise to unwanted capacitative cross-coupling.

A certain minimum number of circuit path intersections is of course unavoidable. As may be seen from FIG. 2a, these circuit path intersections are shifted to the edge of the circuit arrangement however by the arrangement of the switching elements and the input and output lines. As a result, the possibility opens up for manuacturing the circuit path intersections, which are unavoidably necessary, by means of bond connections $1a,1b...5a,5b$ and $1b'$ and $3b'$. In a narrow edge area of the integrated circuit arrangement, contact surfaces are nevertheless to be provided for a bond connection of the terminal points of the semiconductor circuit to the terminal lines of a package casing accommodating the circuit arrangement. The design of the circuit path intersections also by bond connections therefore poses no particular difficulties. As in the circuit path intersections produced by bond connections, the intersecting line members are removed relatively far away from one another, there is hardly any danger of a capacitative coupling between the intersecting line members and even the danger of a short circuit may be eliminated. In FIGS. 2b to 2e, further developments in accordance with the invention of the switching matrix are shown.

If it is assumed that, for a housing assembly and also the wiring of the integrated circuit package on a printed card, the pair of terminal lines $E_{ia,b}$ or $A_{ka,b}$ respectively is to be separated relative to the adjacent pair by means of a control line lying with low resistance for alternating coupling currents to earth potential, which also applies to the arrangement according to FIG. 2a, then an arrangement according to FIG. 2b may be described as a further development of the concept of the invention. Here an arrangement of the column lines in the matrix is to be undertaken relative to FIG. 2a so that almost half the intersections in the matrix may be saved, but wherein the position of the outer terminals remains unchanged. Then, of course, the complicated wiring shown above in FIG. 2b is produced at the edge of the circuit immediately surrounding the bond terminal. FIG. 2c shows a further possibility for carrying out the circuit with output terminals divided over the upper and lower side.

The arrangement shown in FIG. 2d is designed with even simpler wiring in the edge area, and shifts the difficulties into the additionally necessary earth decoupling lines between the individual column lines, which arrangement is used with appropriate formation of the lay-out on the printed card only in the terminal lines of the housing and in the transition to the printed card.

The assignment of the lines in FIG. 2e has been undertaken according to a similar principle. This proposal for lay-out is particularly intended for assembly of the semiconductor chip in a dual-in-line housing, wherein the appropriate terminals of the column lines $a$ and $b$ are passed symmetrically to separate sides of the casing when assembling the chips with the column lines parallel to the longitudinal direction of the housing, and then they are put together again in pairs on the bonded plate. At least in the casing, however, the separation of all outputs from one another by means of an earthed control line is necessary.

FIG. 3 shows a block diagram of a switching matrix lay-out for carrying out the positioning of the integrated circuit with 5 × 4 cross points. The individual geometric units, which consist respectively of two switching elements are designated 11/12, 11'/12', 12/13, . . . 53/53, 53'/54'. Each unit contains two switching elements, which are connected together by one of their terminals and to an input line. A further terminal of each switching element is connected to the adjacent output line. For example, the connecting point of the switching element contained in the unit 11/12 is connected to the input line E1a. At the same input line the connecting point of the switching element contained in the unit designated 13/14 leads to the same input line. As already described with reference to FIG. 2, the wiring connection of the input line E1a is effected between the connecting point of the switching elements in the unit 11/12 and the contact pad 11' located at the edge of the circuit arrangement, preferably by means of a bond connection, wherein the output line A1a is intersected.

In an advantageous further development of the invention, the bond point 11' is left out and direct bond connection between the terminal in the unit 11/12 and the appropriate contact point in the housing takes place. From FIG. 3, it is clear that the same is true for the further units, The crosspoints are arranged in the form of a matrix in lines and columns. With the intended use as a switching matrix in telecommunications devices, very high requirements are placed on freedom from cross-talk. This means that it must be ensured that, as far as possible, no coupling must occur from a switched connection into an open line. Besides the reduction in the number of circuit path intersections, a high attenuation of cross-talk is achieved in the circuit arrangement in accordance with the invention by the fact that the control or triggering means for switching on or blocking the switching elements and the control or triggering lines leading from the control means to the switch elements are arranged in columns between every two columns of cross-points. Manufactured inverter circuits serve as control or triggering means for switching on or blocking the switching elements in integrated technology. In FIG. 3, two columns of inverter circuits 30 are indicated which are arranged between every two columns of crosspoints 11/12 to 51/52 and 11/'/12' to 51'/52' or 13/14 to 53/54 and 13'/14' to 53'/54'. An inverter circuit 30 is respectively assigned to each of the two switching elements contained in a crosspoint (balanced switching). For reasons of facility of inspection, the control or triggering lines leading from the control means (inverters) to the switching elements are not shown, said control lines contributing substantially to the screening effect.

Inverter circuits are preferred, therefore, as a control means for switching on or blocking of the switching elements because, with them, a particularly good decoupling between input and output of the switching elements may be achieved. The switching element connected to the output of the inverter circuit is controlled by the total level of the operating voltage of the circuit arrangement and is changed over thereby, relatively free of faults in the "on" or "off" state, without adjacent switching elements also being energized to carry out switching operations in an undesirable manner.

The entire circuit arrangement is manufactured in MOS technology so as to be monolithically integrated, whereby a large number of crosspoints together with the control means required for their operation may be united closely together on a single substrate with the result of a significant saving in space and costs.

It is advantageous if the active elements of the circuit arrangement are manufactured in accordance with p-channel technology by using the ion implantation for achieving controlled adjustability of the threshold voltages of the MOS inverter load transistors. As a result, in a very simple manner, transistors of the enhancement type and those of the depletion type are united in the same monolithically integrated circuit arrangement. In a preferred embodiment, each of the inverter circuits 30 contains a driving transistor of the enhancement type and a load transistor of the depletion type. With MOS transistors of the depletion type, a current flow occurs, as is known, with a gate-source voltage of zero volts. Therefore, they act, in the case of the conductive driving transistor, which connects the gate of the switching transistor via low impedance to earth, more precisely like current sources, while they connect the control gate to earth at low impedance for coupled alternating current in the case of the blocked driving transistor.

As already mentioned above, a very low forward resistance in the "on" and a very high blocking resistance in the "off" state are desirable for the switching elements which are to make either a connection or separation between input and output lines. Low impedance MOS transistors with a forward resistance in the "on" state of the order of magnitude of some ohms may however only be implemented with a relatively large relationship between channel width and channel length. For example, this relationship has the value 1000. With a minimum channel length, which may be achieved, of approximately 5 micrometers there is in the accepted ratio a channel width of 5000 micrometers. This value makes it clear that a space-saving arrangement of a plurality of such transistors is not easily possible.

Figure 4:
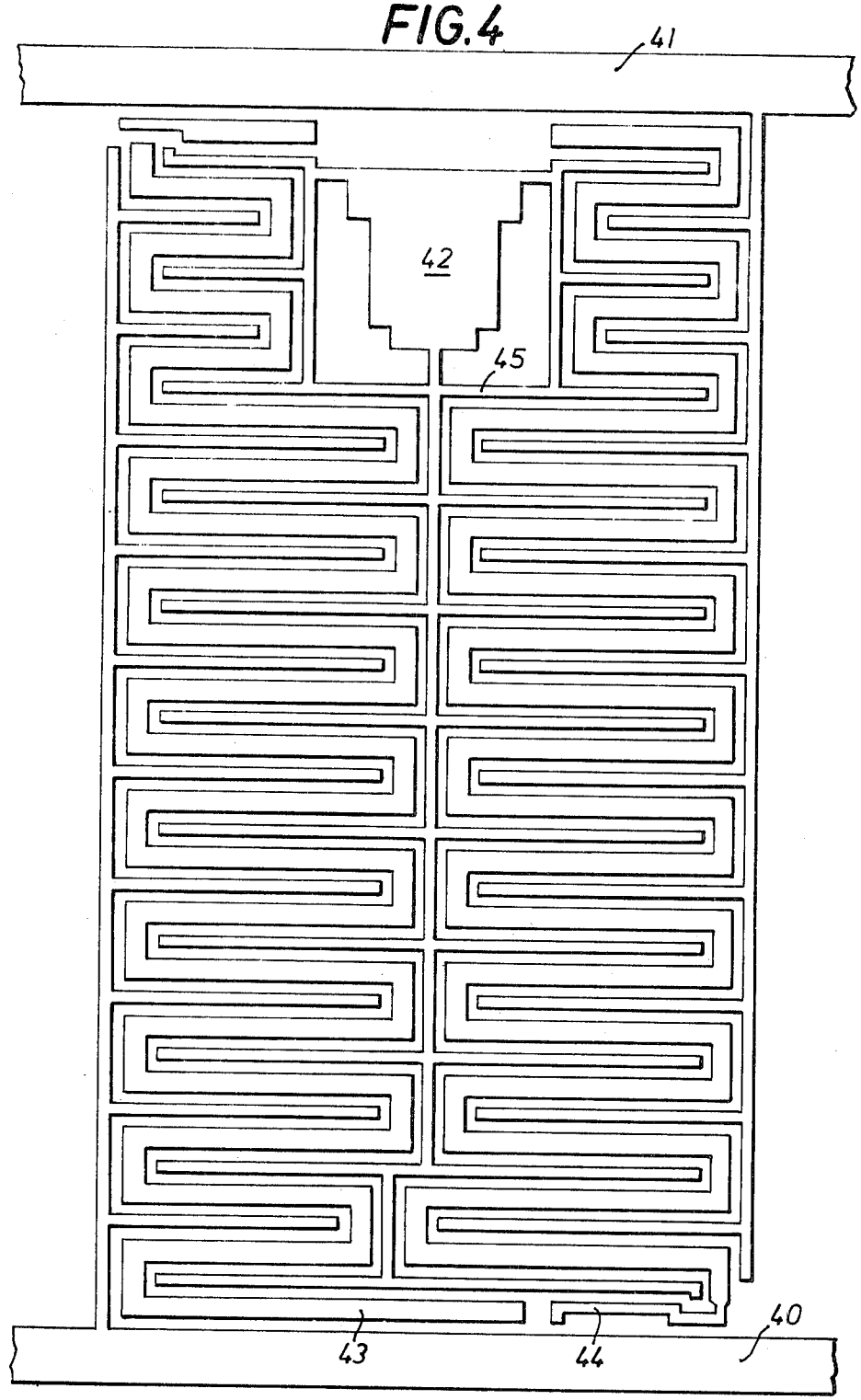
FIG. 4 shows a portion of the circuit arrangement in accordance with the invention showing the construction of a switching element.

In order to avoid this disadvantage the switching elements consisting of MOS transistors are therefore constructed preferably with a meandering path of the electrode terminals. In this manner a MOS transistor may also be manufactured with a relatively large channel width with only small requirement for area. The lay out of such a switching element is shown in FIG. 4, which shows the wiring mask for a section of a switching transistor. Between the two columns lines 40 and 41, two switching transistors are arranged. A line branches from the columns lines, which line contacts the source terminal of the MOS transistor. The drain terminal for both transistors is connected by line arrangement 45 to the bond terminal 42. Metallizing of the control gate of the two transistors is designated 43 and 44. The connection of the control gate at the decoupling inverters takes place via diffused tunnelling of the column line 40.

With high externally controlled voltages, intermodulation could take place as a result of the substrate control effect; this is preferably prevented by means of an additionally applied biasing of the substrate at a suitable level. Measured values lie in the range of some volts.

As may be seen from FIG. 3, further crosspointstate stores are provided in the form of static bistable trigger stages (flip flops) 300 in the circuit arrangement next to the switching elements in the crosspoints 11/12 . . . 53'/54' and in the inverter circuits 30, one of which is assigned respectively to one of the crosspoints and the related inverter circuit. From these stores, connection lines lead to the switching elements or to their control or triggering means, which also increase the screening effect in an advantageous manner between the switching elements and the input and output lines.

Furthermore, an additional screening 100 is provided in the embodiment shown in FIG. 3, which screening is arranged between every second column of the coupling field construction element consisting of 5 × 4 coupling points.

Figure 5:
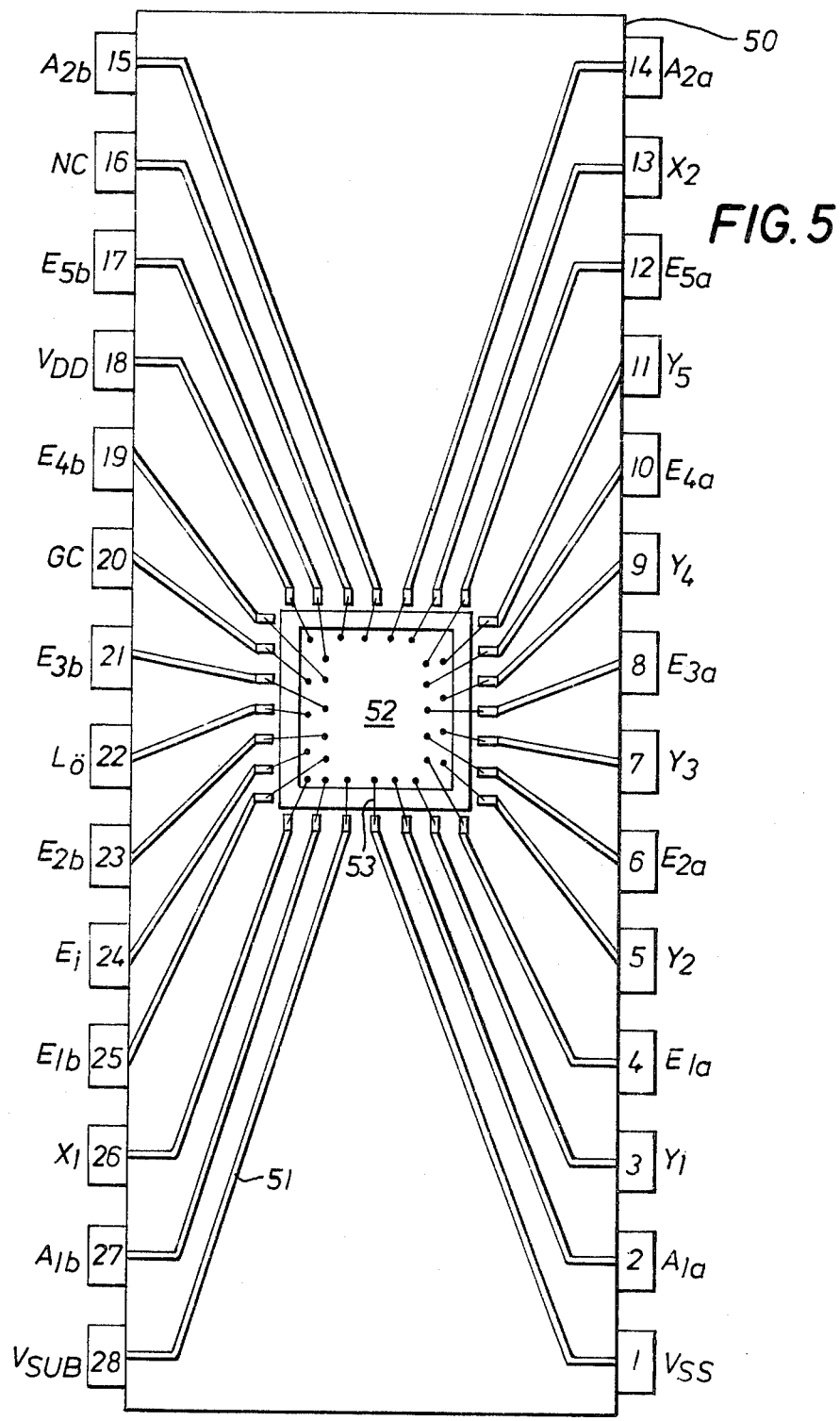
FIG. 5 shows the circuit arrangement mounted in a dual-in-line package.

The monolithically integrated circuit arrangement is accommodated by a dual in line package in conventional manner and as the housing is provided with plug connections the crosspoint array device may be easily exchanged. A section through such a package is shown in FIG. 5. Within the package 50 there are circuit paths 51 which connect the integrated circuit 52 to the terminals 1 to 28 of the casing leading outwards. An electrical connection between circuit 52 and circuit paths 51 is produced by means of bond connections 53. The $a-$ and $b-$ conductors of the line pairs are arranged on separate sides of the housing and may be brought together on the printed plate to form a wiring pair. Between the individual row lines or Eiab or column lines Akab control lines XjYmVrp are arranged, which at the same time serve for decoupling.

It will be understood that the above description of the present invention is susceptible to various modification changes and adaptations.

What is claimed is:

1. In a monolithically integrated semiconductor circuit arrangement, particularly for switching matrices of tele-communications switching systems, including a plurality of semiconductor switching elements arranged in a matrix, a plurality of intersecting input and output circuit paths which are arranged in rows and columns and which may be selectively connected together by means of said switching elements, control or triggering means for switching on or blocking said switching elements to selectively connect said input circuit paths to said output circuit paths, and control or triggering lines leading from said control or triggering means to said switching elements, the improvement wherein: said switching elements are respectively connected in pairs and are arranged between every second input or output circuit path, said switching elements which have been connected together in pairs being connected together to the adjacent input line with one of their terminals and being connected individually to a respective one of the adjacent output lines with their other terminal.

2. A circuit arrangement as defined in claim 1, wherein said control or triggering lines and said control or triggering means for switching on or blocking of the switching elements are arranged in a column between every two columns of said pairs of switching elements in order to increase the screening effect.

3. A circuit arrangement as defined in claim 2, wherein such control means for switching on or blocking of the switching elements comprise monolithically integrated inverter circuits comprise which are arranged in the immediate vicinity of the associated switching elements.

4. A circuit arrangement as defined in claim 3, wherein an inverter circuit is provided for each of the two switching elements in a cross point for balanced transmission.

5. A circuit arrangement as defined in claim 4, further comprising a single crosspoint state store for each crosspoint for controlling the two associated inverters.

6. A circuit arrangement as defined in claim 3, wherein said inverter circuit comprises a driving transistor of the enhancement type and a load transistor of the depletion type.

7. A circuit arrangement as defined in claim 6, wherein an MOS transistor of the depletion type constitutes said load transistor with at least the threshold voltage produced by an ion implantation process.

8. A circuit arrangement as defined in claim 1, wherein said switching elements comprise MOS transistors with a large relationship of channel width to channel length and source and drain regions determining the channel length which are interlaced in meander form.

9. A circuit arrangement as defined in claim 8, wherein said two switching elements connected together with a common electrode terminal comprise a geometric unit.

10. A circuit arrangement as defined in claim 8, wherein said MOS transistors have a ratio of channel width to channel length not substantially below a value of 1000.

* * * * *